July 7, 1959  J. W. HOWLETT ET AL  2,893,796

SEALING RINGS

Filed Nov. 15, 1954

Inventor
John W. Howlett
Kenneth A. Blacklock
By
Attorneys

United States Patent Office 2,893,796
Patented July 7, 1959

2,893,796

SEALING RINGS

John W. Howlett and Kenneth Arthur Blacklock, Lymington, England, assignors to Wellworthy Limited, Lymington, England, a British company Application November 15, 1954, Serial No. 468,943

Claims priority, application Great Britain November 18, 1953

5 Claims. (Cl. 309—43)

The present invention relates to sealing rings, and to sealing arrangements incorporating the same, for sealing movable members, such as pistons or plungers movable in cylinders or reciprocating or rotary shafts movable in a gland or bearing, against leakage therepast.

From one aspect the invention consists in a sealing ring comprising a metal ring having a rubber ring bonded on to its internal or external peripheral face, depending upon whether the ring is to be outwardly or inwardly acting, the composite metal and rubber ring being split similar to a conventional piston ring or comprising a plurality of separate ring segments. The rubber ring is preferably shaped or provided with recessed or cut away portions so that when the composite ring is compressed into a ring groove with the rubber bearing against the base of the ring groove, one or more cavities will be formed into which the rubber can plastically flow as the ring is compressed into the groove. For this purpose the rubber ring may conveniently be shaped with a chamfer on one of its side faces.

From another aspect the invention comprises a sealing arrangement comprising two or more sealing rings as above described arranged side-by-side in a ring groove with the ring gaps in the adjacent rings displaced out of alignment. Such a sealing arrangement provides a very efficient seal which is capable of withstanding extremely high pressures without leakage whilst providing a metal to metal bearing surface between the ring and the cooperating surface.

With such a sealing arrangement comprising a pair of sealing rings the adjacent faces of the rubber rings are preferably chamfered or otherwise shaped to form a cavity therebetween into which the rubber may flow when the rings are compressed.

In order that the invention may be more clearly understood, reference will now be made to the accompanying drawing, in which.

Figure 1:
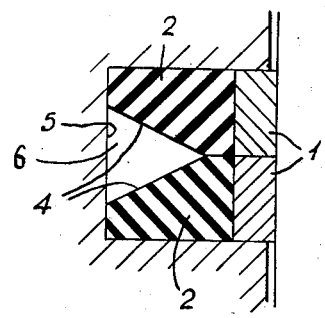
Fig. 1 shows a section through a ring groove fitted with sealing rings according to this invention.
Figure 2:
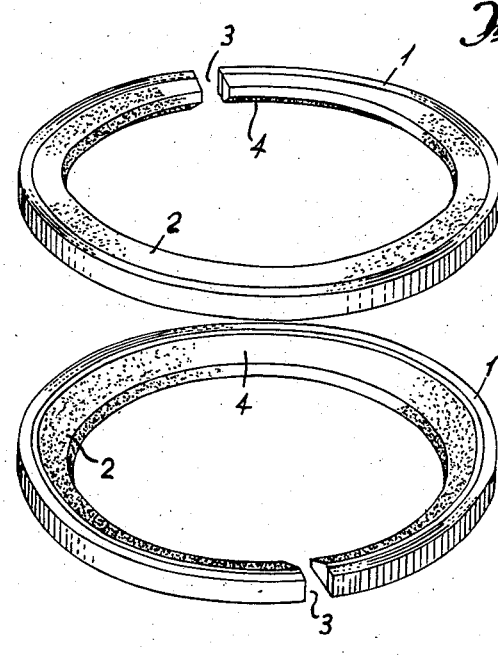
Fig. 2 shows an exploded perspective view of a pair of sealing rings before assembly in a ring groove.

Referring to the drawing, each sealing ring comprises a metal ring 1, preferably made of cast iron, to the internal periphery of which is bonded a ring 2 of natural or synthetic rubber or rubber-like material. The rubber may be bonded to the internal periphery of the metal ring by any known process. The rings are split at 3 similar to a conventional piston ring in order to allow it to be sprung over a shaft or into a groove. The side face of each rubber ring is chamfered towards the bore of the ring as shown at 4. The chamfer preferably does not extend for the full width of the side face.

For achieving a good seal, two such rings are assembled side-by-side in the ring groove 5 with their chamfered side faces adjacent to one another as shown in Fig. 1. The combined radial depth of the rubber and metal portions of the composite ring is made slightly greater than the depth of the ring groove so that, when the rings are compressed to close the gaps therein the rubber within the ring groove will also be pressed against the base thereof, the cavity between the two rings providing a space into which the rubber can flow when compressed. The radial compression of the rubber provides the necessary wall pressure between the periphery of the ring and the cylinder against which it moves.

The pair of rings are arranged in the groove with the gaps therein displaced from one another, preferably at diametrically opposite points. With this arrangement if any oil or other fluid should leak through the gap of the ring which is on the pressure side, this fluid will flow into the cavity 6 between the rings and assist in loading the rings on to the surface against which they bear. The rubber rings will be forced into close contact with the side walls of the ring groove and furthermore will be urged to seal over or flow into the gap of the second ring on the low pressure side, thereby resisting or preventing leakage of fluid through the gap in the second ring.

In manufacture the metal rings preferably have the rubber bonded thereto before splitting. An inert closed ring with the rubber bonded thereto will, after splitting, spring open to form a gap of larger width than would be the case if the inert ring had no rubber bonded thereto. The working surfaces of the rings may be plated with chromium or other desired metal.

Whilst a particular embodiment has been described, it will be understood that various modifications may be made without departing from the scope of the invention. Thus each ring may comprise two or more separate ring segments, so that there is a plurality of splits in each ring. Moreover the rubber rings may be shaped otherwise than by chamfering, for example by radiussing or providing stepped recesses around their internal peripheries, in order to provide a cavity or cavities into which the rubber may flow when the ring is compressed in the ring groove. Alternatively the ring groove may be shaped to provide such cavity or cavities.

Furthermore, although it is preferred that the rubber rings should bottom in the ring grooves in order that compression of the rubber may provide the appropriate wall pressure, this is not essential as any fluid or oil which may be forced into the space behind the rings will, even in such a construction, assist in compressing the rubber to resist leakage through the gap of the ring on the low pressure side. Again for some application a single ring is sufficient to provide the appropriate seal; in this case it is preferred that the chamfered side of the rubber ring should face the high pressure side.

It will be understood that the term "rubber" as used in the specification and claims is intended to include natural rubber and also synthetic rubbers.

We claim:

1. A sealing arrangement comprising a member having a sealing ring groove formed therein, at least two composite sealing rings disposed side-by-side in said ring groove, each of said sealing rings comprising a metal ring, a rubber ring bonded on to the peripheral face of said metal ring which faces the bottom of the groove, said rubber ring extending substantially entirely across said face, but not extending axially beyond said face and radially over the metal ring, at least one radially-directed split extending through said metal ring and said rubber ring, and at least a part of that surface of each of said rubber rings which faces the bottom of the groove being shaped so that said part of said rubber rings has a depth in the axial direction of the ring which is less than the axial depth of the metal ring, said sealing rings being arranged in said groove such that the splits in the rings are displaced out of alignment and so that said shaped parts, with said groove, define at least one circumferentially-extending cavity behind the rubber rings.

2. A sealing arrangement as claimed in claim 1, in which the combined radial depth of the rubber and metal portions of each composite ring is made slightly greater than the depth of the ring groove in which the rings are located so that when the rings are compressed to close the gaps therein the rubber within the ring groove will be pressed against the bottom thereof.

3. A sealing arrangement comprising a member having a sealing ring groove formed therein, a pair of sealing rings disposed side-by-side in said ring groove, each of said sealing rings comprising a metal ring, a rubber ring bonded on to the peripheral face of said metal ring which faces the bottom of the groove, said rubber ring extending substantially entirely across said face, but not extending axially beyond said face and radially over the metal ring, at least one radially-directed split extending through said metal ring and said rubber ring and at least a part of that surface of each of said rubber rings which faces the bottom of the groove being shaped so that said part of said rubber rings has a depth in the axial direction of the ring which is less than the axial depth of the metal ring, said two sealing rings being arranged in said groove such that the splits in the rings are displaced out of alignment and so that said shaped parts, with the groove, define a circumferentially-extending cavity behind the rubber rings.

4. A sealing arrangement comprising a member having a sealing ring groove formed therein, a pair of sealing rings disposed side-by-side in said ring groove, each of said sealing rings comprising a metal ring, a rubber ring bonded on to the peripheral face of said metal ring which faces the bottom of the groove, said rubber ring extending substantially entirely across said face, but not extending axially beyond said face and radially over the metal ring, and at least one radially-directed split extending through said metal ring and said rubber ring, the adjacent axially extending faces of the two rubber rings being circumferentially chamfered to form a cavity therebetween within the sealing ring groove, and said sealing rings being arranged in said groove such that the splits in the two sealing rings are displaced out of alignment.

5. A sealing arrangement comprising a piston having a sealing ring groove formed therein, a pair of sealing rings disposed side-by-side in said ring groove, each of said sealing rings comprising a metal ring, a rubber ring bonded onto the peripheral face of said metal ring which faces the bottom of the groove, said rubber ring extending substantially entirely across said face, but not extending axially beyond said face and radially over the metal ring, at least one radially-directed split extending through said metal ring and said rubber ring, the two rubber rings being chamfered partly across the axially-extending face of each ring to form a circumferentially extending cavity therebetween within the sealing ring groove and said sealing rings being arranged in said groove such that the splits in the two sealing rings are displaced out of alignment.

References Cited in the file of this patent

UNITED STATES PATENTS

| | | |
|---|---|---|
| 2,208,620 | Baisch | July 23, 1940 |
| 2,380,654 | Lane et al. | July 31, 1945 |
| 2,456,529 | Naab | Dec. 14, 1948 |
| 2,466,428 | Hufferd et al. | Apr. 5, 1949 |
| 2,557,835 | Monahan | June 19, 1951 |
| 2,709,630 | Patterson | May 31, 1955 |

FOREIGN PATENTS

| | | |
|---|---|---|
| 130,655 | Australia | Dec. 15, 1948 |